(12) United States Patent
Kikuchi et al.

(10) Patent No.: US 8,612,466 B2
(45) Date of Patent: Dec. 17, 2013

(54) INFORMATION PROCESSING APPARATUS, DOCUMENT RETRIEVAL SYSTEM, DOCUMENT RETRIEVAL METHOD, AND PROGRAM

(75) Inventors: Hiroaki Kikuchi, Kanagawa (JP); Hirofumi Nishikawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 13/121,400

(22) PCT Filed: Aug. 14, 2009

(86) PCT No.: PCT/JP2009/064360
§ 371 (c)(1),
(2), (4) Date: Mar. 28, 2011

(87) PCT Pub. No.: WO2010/041516
PCT Pub. Date: Apr. 15, 2010

(65) Prior Publication Data
US 2011/0179075 A1 Jul. 21, 2011

(30) Foreign Application Priority Data
Oct. 8, 2008 (JP) .................................. 2008-261481

(51) Int. Cl.
*G06F 7/00* (2006.01)
(52) U.S. Cl.
USPC ........... 707/759; 707/781; 707/783; 707/785; 707/786
(58) Field of Classification Search
None
See application file for complete search history.

(56) References Cited

U.S. PATENT DOCUMENTS

| | | | |
|---|---|---|---|
| 6,199,082 B1 | 3/2001 | Ferrel et al. | |
| 7,840,557 B1 * | 11/2010 | Smith et al. | 707/722 |
| 2001/0027451 A1 * | 10/2001 | Taguchi et al. | 707/3 |
| 2003/0101200 A1 | 5/2003 | Koyama et al. | |

(Continued)

FOREIGN PATENT DOCUMENTS

| | | |
|---|---|---|
| EP | 0774722 A2 | 5/1997 |
| EP | 0774722 A3 | 5/1997 |

(Continued)

OTHER PUBLICATIONS

International Search Report for International Application No. PCT/JP2009/064360, dated Oct. 13, 2009, 1 page [54.47JP (ISR)].

(Continued)

*Primary Examiner* — Ahn Tai Tran
(74) *Attorney, Agent, or Firm* — Janaki K Davda; Konrad, Raynes, Davda & Victor LLP

(57) ABSTRACT

An information processing apparatus includes a database management unit that generates an index including access authority for a document and manages the index together with the document, a user information acquisition unit that acquires, as user information, the access authority for a user identification value, a document search unit that acquires the user information and a search request including a search expression, generates a combined search expression by combining an inclusion relationship expression with the search expression, the inclusion relationship expression including an operator that designates an inclusion relationship for access authority of an originator, and acquires a search result at a shared level enabling sharing under a plurality of user identification values in a domain including the plurality of user identification values, and a cache management unit 218 that registers the search result at the shared level as a cache item identified as the one at the shared level.

20 Claims, 10 Drawing Sheets

(56) References Cited

U.S. PATENT DOCUMENTS

| | | | |
|---|---|---|---|
| 2007/0255698 A1* | 11/2007 | Kaminaga et al. | 707/3 |
| 2009/0037428 A1* | 2/2009 | Achtermann et al. | 707/10 |
| 2010/0235907 A1* | 9/2010 | Bowman et al. | 726/21 |

FOREIGN PATENT DOCUMENTS

| | | |
|---|---|---|
| JP | 9325968 | 12/1997 |
| JP | 2001344245 | 12/2001 |
| JP | 2003162441 | 6/2003 |

OTHER PUBLICATIONS

English Abstract and Machine Translation for JP2001344245A, published on Dec. 14, 2001, Total 61 pp.

IDS Report, Feb. 13, 2013, from the Jan. 29, 2013 Office Action for JP920080218JP2, Total 3 pp.

Response to European Patent Office Communication, dated Jun. 12, 2013, for International Application No. 09819052.3-1956/2352103 PCT/JP 2009064360, Total 7 pp.

* cited by examiner

| WORD | OCCURRENCE POSITION LIST |
|---|---|
| ibm | DOCUMENT 1, DOCUMENT 2, DOCUMENT 4 ··· |
| patent | DOCUMENT 2, DOCUMENT 3, DOCUMENT 4 ··· |
| acl:UA | DOCUMENT 1, DOCUMENT 4 ··· |
| acl:GX | DOCUMENT 3, DOCUMENT 4 ··· |

A SEARCH EXPRESSION FOR SECURE SEARCH:
IN THE CASE WHERE USER UA BELONGS TO GROUP GX
:query=ibm AND (acl:UA OR acl:GX)
:SEARCH RESULT=[DOCUMENT 1, DOCUMENT 4]

CACHE INDEX=hash (ibm, and, or, acl:GX)

FIG. 4

| CACHE INDEX | CACHE CONTENTS(SEARCH RESULT) |
|---|---|
| hash (ibm, acl:GX, in, acl:GY) | DOC(ibm) in GX ∪ DOC(ibm) in GY |
| hash (ibm, acl:GX, in, acl:GY, in acl:GZ) | DOC(ibm) in GX ∪ DOC(ibm) in GY ∪ DOC(ibm) in GZ |
| hash (ibm, acl:GX) | DOC(ibm) in GX |
| hash (ibm, acl:UA) | DOC(ibm) in UA |
| ... | ... |

CACHE MISS : ibm AND (acl:UA OR acl:GX OR acl:GY OR acl:G...) ~ 910

CACHE HIT : ibm AND (acl:user_a OR CACHE RESULT) ~ 920

CACHE HIT : ibm AND (CACHE RESULT OR CACHE RESULT) ~ 930

FIG. 9

INFORMATION PROCESSING APPARATUS, DOCUMENT RETRIEVAL SYSTEM, DOCUMENT RETRIEVAL METHOD, AND PROGRAM

FIELD OF THE INVENTION

The present invention relates to document search, and more particularly to an information processing apparatus, a document search system, a document search method and a program capable of securing security when full-text indexes are used, while improving search efficiencies.

BACKGROUND

Along with the improvement in network technique and performance of information processing apparatuses, so-called full-text index searching has been enabled, which conducts a search by using words in a document as a whole as an index. As for a document search, a system allowing all users to search all documents in an open environment also is available. Further, a so-called security search system exists, which uses access authorization of a user who accesses a document search system so as to limit documents accessible by the user in accordance with the access authorization, thus securing security of the documents stored in a database or the like.

In a document search system having a function of inheriting document security (hereinafter called secure search), in many cases, access right information for a document is kept in a full-text index of documents to be searched, which is used as an access index to execute a judgment for access authority during a document search. In a conventional search system, in many cases, the secure search is enabled by extracting only a viewable document with a user name or a group name acquired during a search by a user or with a hierarchical/inclusion relationship (hereinafter collectively referred to as user information) thereof that matches with access right.

Such a document search system creates a search expression including user information during execution of a search, thus enabling the secure search without changing a base of a full-text search greatly. The search expression including user information, however, is an OR search expression in which all group names to which a user belongs as well as access authority of the user who accesses are enumerated. As a result, the conventional secure search has the following problem: an increase in documents and group hierarchies in number leads to an increase of the documents included in a group and groups in number, thus increasing search targets nonlinearly and affecting search performance greatly.

As a known technique to cope with the above-stated problem, there exists a technique of caching a search result to speed up a search at the second time and later. The processing of caching a search result can speed up the search processing using the same search expression. However, as far as the secure search is concerned, there is a specific problem that access authority among users or groups has to be kept. That is, since the cache result has to be registered based on the access authority, a cache index will be created including access authority specific to a user so as to identify the user. As a result, cache items generate a cache hit only when "the same user" executes the process using "the same search expression", and generate a cache miss in the other cases, thus resulting in a failure to improve a cache use efficiency.

Such a problem results from a limited generation of a cache hit in the conventional document search system that is generated only when the same user inputs the same search expression a plurality of times. Such a search is not performed so often except for the case where there is any trouble of a user or in the document search system, and therefore a cache hit rate will be degraded greatly as compared with the case of a non-secure search.

A number of document search systems enabling the secure search have been known so far. For instance, Japanese Patent Application Publication No. 2005-284608 (Patent Document 1) discloses a technique for performing a secure search at a high speed. In Patent Document 1, an attribute value of access authority is set in a database beforehand, thus enabling the secure search.

The technique of Patent Document 1 requires, prior to the search processing, attaching a label to a combination of access right information in an index, and the search requires performing an OR search of user's access authority exhaustively and generating a union of the search results, and therefore an increase of groups and an increase of the number of documents accumulated for each group lead to a nonlinear increase of overhead of the search processing, thus degrading the search efficiency nonlinearly. As a result, it is not practical to directly apply such a technique to a system of targeting a full-text index search for secure search, in terms of the search efficiency.

Japanese Patent Application Publication No. 2004-164555 (Patent Document 2) discloses a search apparatus and a search method as well as an index construction apparatus therefor. Patent Document 2 relates to the invention of realizing a secure search, which specifies a security domain and registers a plurality of indexes to set access right to the security domain, thus securing security for each domain. Here, an administrator assigned for each domain causes a collection program for collecting documents in a security domain to run so as to collect accessible documents in the security domain and to create and edit indexes, thus generating an index for each security domain.

The processing of Patent Document 2 also enables a secure search but increases a burden of an administrator for index management. Further, the collection of documents using a collection program results in the execution of a document search processing for searching and extracting documents, and therefore a document search program has to be implemented in a context of a collection program for an administrator and a document search program for a general user, which generates wasted software modules.

Furthermore, the processing of Patent Document 2 assigns a hierarchical structure to documents and reduces the number of documents to be searched by performing pruning to check access right for each index, thus improving a search efficiency or response of the secure search. The hierarchical structure assigned to documents and the pruning processing can reduce a space to be searched. However, even when the hierarchical structure is assigned to documents, an OR search has to be executed so as to include access right of a user exhaustively if access is made to a document located at the bottom layer of a branch. As a result, a search speed or response will vary depending on a search expression to be used, thus degrading scalability of the search processing.

Moreover, there is a case where a unique hierarchical structure cannot be assigned to documents in accordance with a security level thereof, and further when a security level has to be changed, there is inconvenience to reconstruct a tree structure. Further, it can be assumed that a document, which can be searched originally, will be removed from a search target due to the hierarchical structure assigned to documents, and therefore this technique cannot be always applied to a general-purpose document search. Additionally, when a user makes an access using private access authority, such an access is realized without depending on the hierarchical structure, and therefore a plurality of index structures have to be prepared. Therefore, like Patent Document 1, this technique also is not very practical for a secure search targeted to a full-text search.

CITATION LIST-PATENT DOCUMENTS

[Patent Document 1] Japanese Patent Application Publication No. 2005-284608
[Patent Document 2] Japanese Patent Application Publication No. 2004-164555

As stated above, in order to realize a secure search, the conventional secure search processing imposes a burden on an administrator to manage security and requires parallel implementation of similar software for secure search and document collection. The conventional secure search processing further requires changing an index structure greatly in accordance with a change in security level and also requires parallel implementation of different index structures, thus making it difficult to apply this processing directly to the secure search for a full-text index search. Additionally, an increase in a hierarchical structure of groups to which a user belongs causes a non-linear increase in overhead for search processing, thus degrading the search efficiency, and therefore the conventional secure search technique cannot improve the search efficiency while flexibly dealing with an increase in the number of documents and an increase in the hierarchical structure of groups.

SUMMARY

In view of the above, it is an object of the present invention to provide an information processing apparatus, a document search system, a document search method, and program, which are capable of improving a search efficiency of a secure search processing using a full-text index.

According to the present invention, in order to cope with the above-stated problems, a cache hit ratio is improved without modifying a full-text index structure for a secure search, and further the search efficiency in the secure search is improved by reducing the number of set operations of a document search expression.

The security is secured for each user by employing a hierarchical structure for users rather than for documents. Identification of the hierarchical structure is acquired as user information by a search server at the time of search execution using information entered during user log-in. The search server combines a search expression input by the user and an inclusion relationship expression generated from access authority of the user to create a combined search expression. A document search system generates, from the combined search expression, a search expression executing a search at a user's private level and a search expression executing a search at a shared level, which are executed independently.

Each search result is associated with a cache index, which can identify a search result at a private level and a search result at a shared level, and is stored in a cache memory.

In a specific embodiment, a cache index for indexing a search result at a private level is generated by hash calculation using a search expression that gives the search result at the private level, whereas a cache index for indexing a search result at a shared level is generated by hash calculation using a search expression that gives the search result at the shared level. As a result, the searching of a cache index for the search result at the shared level leads to a cache hit even when a different user conducts a search, as long as the search relating to the same shared level is concerned. However, a cache hit is not generated for a cache item including a private level, and therefore security at a private level can be guaranteed while improving a cache hit ratio at a shared level.

Similarly, the search result at the private level is registered as a cache item with a cache index indicating the private level. When a search request is at a private level, a search of the cache index is executed, and when a cache hit occurs, the cache contents are set as a search result.

On the other hand, in the case of a cache miss, a full-text index search using a full-text index is executed even at a shared level or at a private level, to generate a new search result. The generated new search result is registered in association with a cache index generated by hash calculation of a search expression used to generate the new search result. Thereafter, when a search request belonging to the same search expression is received, the cache contents can be returned in response to a cache hit without executing a full-text index search.

As a result, according to the present invention, cache contents at a shared level are registered including all documents accessible in the units of group hierarchies that the user searched in the past. As a result, when a cache hit occurs at a shared level, it is possible to generate a search result set by performing only one OR operation with a search result from a cache hit at a user's private level or from index search, so that processor ability consumed to perform a set operation can be remarkably reduced.

Further, according to the present invention, an increase in the number of users included in a group leads to improvement of a cache hit ratio. Moreover, even when a user changes a group or group hierarchical levels increase, a probability of executing a full-text index search involving a set operation corresponding to the number of group hierarchical levels can be suppressed to the minimum. Therefore, search efficiencies of a secure search can be improved, and the secure search can flexibly deal with an increase in group hierarchical levels and accordingly an increase in the number of documents.

BRIEF DESCRIPTION OF THE DRAWINGS

FIG. 4 illustrates an example of a full-text index 400 managed by a search server 110 of the present embodiment.

FIG. 6 illustrates an example of a data structure 600 created in a cache memory 222 of the present embodiment.

FIG. 9 describes the reduction in an OR processing and the improvement in cache item availability by secure document search of the present embodiment, using a combined search expression 900 in the processing of FIG. 8 including the search result at a private level.

DESCRIPTION OF EMBODIMENTS

Figure 1:
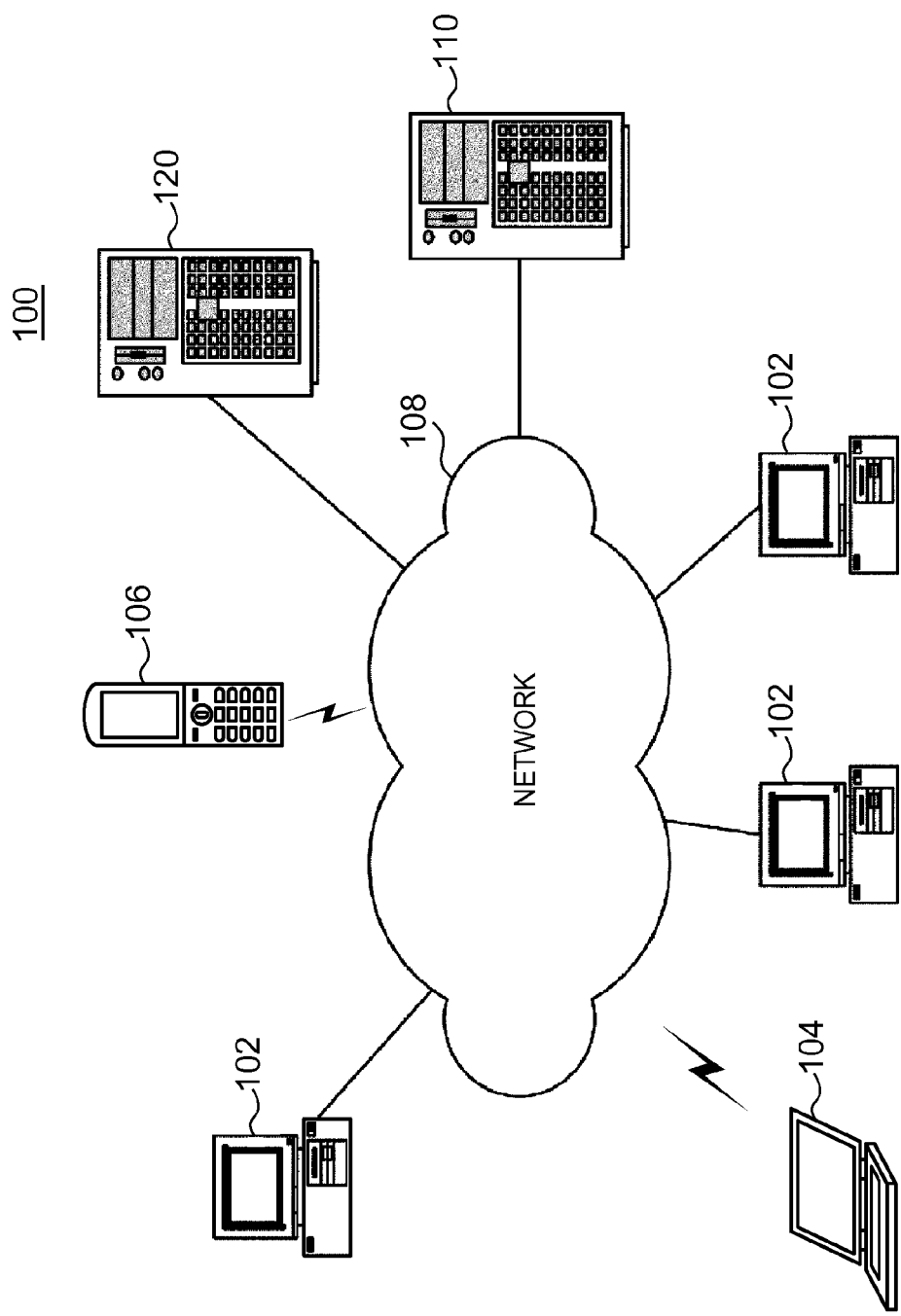
FIG. 1 is a schematic view of a document search system 100 of the present invention.

The following describes the present invention by way of embodiments, which does not intend to limit the present invention to the following embodiments. FIG. 1 is a schematic view of a document search system 100 of the present invention. The document search system 100 includes a network 108 such as the Internet or a LAN, and a plurality of terminal devices 102, 104, and 106 (hereinafter simply called a terminal device 102) that are connected with the network 108, are operated by users, and access a search server 110 via the network 108

According to the present embodiment, the search server 110 executes a secure search with respect to documents stored in a document database (not illustrated) managed by the search server 110. In the present embodiment, a document means general electronic data, which may include text, image, audio or multimedia contents including the combination of these data. The network 108 is connected with a user management server 120 that manages access authority of a user who accesses the search server 110. When a user tries to log on the search server 110, the user management server 120 receives an inquiry from the search server 110 and searches for user's access authority using a user identification value (hereinafter called a user ID), for example, acquired during the log-on. The user management server 120 manages a user management database (not illustrated) and manages access authority for each user using a relational database, for example.

When access authority for the user is found, the user management server 120 returns a search result as user information to the search server 110, thus enabling the search server 110 to create an inclusion relationship expression using the user's access authority. The search server 110 manages a document database (not illustrated), and generates a full-text index as an inverted index concerning the documents managed by the search server 110, in order to execute a full-text index search of the documents registered in the document database.

Note here that the search server 110 and the user management server 120 in FIG. 1 are separately illustrated to explain a server function provided by the document search system 100, and in a specific embodiment, for example, it may be configured as an integrated server including rack-mounted server units such as BladeCenter available from IBM Corporation (BladeCenter is a registered trademark of International Business Machines Corporation).

The above-described search server 110 and user management server 120 may be implemented by an information processing apparatus, which may implement a CISC architecture processor such as Pentium®, Xeon®, Celeron®, or Athlon® or a RISC architecture processor such as PowerPC®. These processors may be single-core or multi-cure. The search server 110 and the user management server 120 are controlled by an operating system (hereinafter simply referred to as OS) such as Windows® 200X, UNIX®, Linux®, or the like.

The server 110 and the user management server 120 execute a server program such as CGI, servlet, Apache or the like implemented using a programming language such as C, C++, Java®, Java® Beans, Perl, Ruby or Python under the management of the above-described OS, to provide various services.

Further, in order to implement a transaction between the search server 110 and the user management server 120 via the network 108, any known transaction protocol may be used. For instance, in order to perform authentication of a user who accesses the search server 110 or to search for the access authority thereof, the search server 110 may use DAP (Directory Access Protocol), LDAP (Lightweight Directory Access Protocol) or the like to generate a transaction concerning user information. In order to transfer a file, for example, a file transfer protocol such as HTTP or FTP may be used, or a distributed computing environment such as RMI (Remote Method Invocation) or RPC (Remote Procedure Call) may be used.

Meanwhile, the terminal device 102 is implemented as a personal computer or a work station, the terminal device 104 is configured as a PDA (Personal Data Assistant), and the terminal device 106 is implemented as an information processing device such as a mobile phone. The terminal device 102 may include any known single-core processor or a dual-core processor as a processor (MPU). The terminal devices 102, 104, and 106 may be controlled by any known OS such as Windows®, Windows® CE, UNIX®, Linux®, Mac OS®, OS exclusively used for mobile phones or the like.

The terminal devices 102, 104, and 106 and the search server 110 are connected via the network using a transaction that uses a file transfer protocol such as a HTTP protocol based on a transaction protocol such as TCP/IP. To this end, the terminal device 102 implements browser software such as Internet Explorer®, Mozilla®, Opera®, or Netscape Navigator®, to access the search server 110 and to perform secure search of documents after log-on authentication.

Note here that the transaction between the search server 110 and the terminal devices 102, 104, and 106 is not limited to a HTTP protocol on a communication infrastructure using wired communication or wireless communication, and they may be configured as a terminal device-server system referred to as a so-called distributed computing system (DCE) that uses a remote access protocol such as RMI (Remote Method Invocation) or RPC (Remote Procedure Call) and is implemented based on CORBA (Common Object Resource Broker Architecture), for example. The detailed description of the user management server 120 will be omitted, because it does not relate to the substance of the present embodiment.

Figure 2:
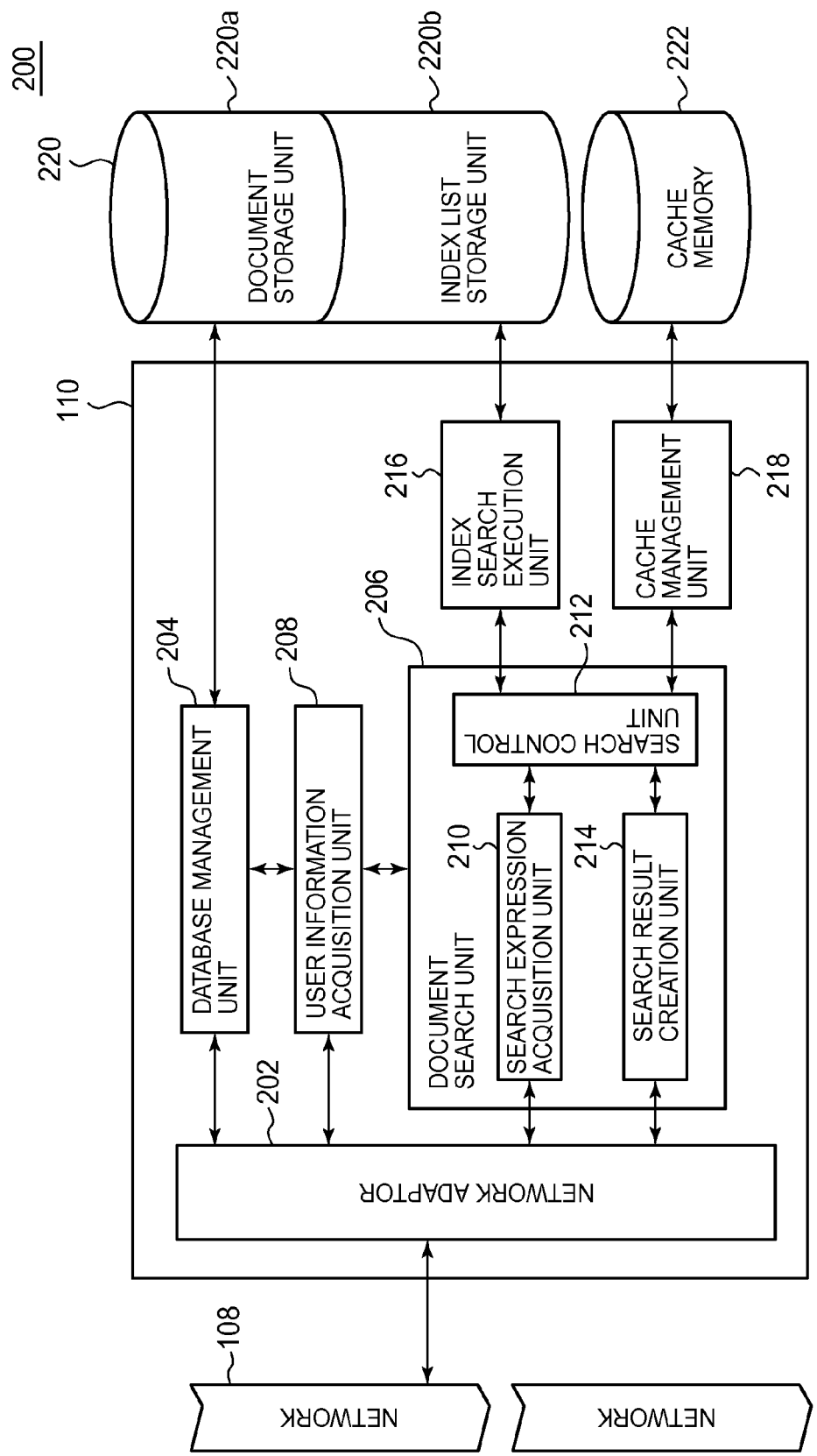
FIG. 2 is a functional block diagram of a search server 110 of the present embodiment.

FIG. 2 illustrates a functional block configuration 200 of the search server 110 of the present embodiment. Each functional block illustrated in FIG. 2 is implemented as functional means on the search server 110 by making a processor load programs in an execution space such as a RAM and execute the programs. The search server 110 includes a network adaptor 202, a database management unit 204 and a document search unit 206.

The network adaptor 202 receives a document search request or a document registration request from the terminal device 102 via the network 108, passes the received request to a functional unit that executes a processing corresponding to the received request or creates a search result file in an appropriate format from a search result set, and sends the same to the clients 102, 104, and 106. When receiving a document registration request from the terminal device 102, the search server 110 invokes the database management unit 204 to execute registration of a document and a full-text index in a document database 220.

The full-text index of the present embodiment is not limited to a specific format, and the present embodiment uses inverted-index type indexing with consideration given to the efficiency of the full-text search. The database management unit 204 stores the received document in a document storage unit 220a of the document database 220, and registers a generated inverted index in an index list storage unit 220b of the document database 220 in association with the document. A unique document identification value is assigned to the document, and a search word in the inverted index is registered in association with the document identification value. The database management unit 204 uses access authority set for the document to register the access authority in the full-text index. The access authority in the full-text index is referred to during the secure search so as to examine the access authority of a user.

In the present embodiment, the access authority of the user is collectively managed by the user management server 120. When receiving a registration request of a document from the user, the search server 110 invokes a user information acquisition unit 208 to refer to information such as a user ID and a password input by the user at the time of log-on, and accesses the user management server 120 to execute access authentication of the user. When the access authentication succeeds, then the user information acquisition unit 208 acquires the access authority of the user as user information and passes the same to the database management unit 204, thus generating an index corresponding to the access authority given to the user in the full-text index and registering the index in the inverted index.

According to the present embodiment, the document search unit 206 executes a secure search, and includes a search expression acquisition unit 210, a search control unit 212 and a search result creation unit 214. The search expression acquisition unit 210 acquires search words and logical operators connecting the search words included in the document search request. The acquired search expression is sent to the search control unit 212 and buffered therein to generate a combined search expression. The search result creation unit 214 receives a search result from the search control unit 212, generates, based on the search result, a search result file as a structured document such as HTML or XML or in a format corresponding to a terminal device and a program, and returns the same to an originator of the search request via the network adaptor 202. When receiving a plurality of search results from the search control unit 212, the search result creation unit 214 creates a union of the plurality of search results to generate a search result.

According to the present embodiment, the search control unit 212 controls the secure search processing. The search control unit 212 generates an inclusion relationship expression based on the access authority acquired by the user information acquisition unit 208 at the time of user's log-on, and combines the inclusion relationship expression with a search expression received from the search expression acquisition unit 210 to generate a combined search expression. For instance, it is assumed that the search expression acquired by the search expression acquisition unit 210 is "ibm AND patent" and user information of GX∈GY∈UA (GY is an upper group including GX, and a user UA is a member of GX) is received as a group hierarchy indicating the inclusion relationship of the access authority of the user.

The search control unit 212 generates the inclusion relationship expression based on the acquired user information as "acl:UA IN acl:GX IN acl:GY" using an IN operator, and combines this with the search expression "ibm AND patent" to generate a combined search expression {(ibm AND patent) AND (acl:UA IN acl:GX IN acl:GY)}. The IN operator instructs a search processing of specifying an inclusion relationship of the access authority of the user, which will be described later in detail. In the above-described context of the present embodiment, the search control unit 212 controls the search by an index search execution unit 216 and a cache management unit 218 to execute a secure search. The search control unit 212 generates the combined search expression and passes the combined search expression to the cache management unit 218 and the index search execution unit 216.

The cache management unit 218 manages a cache memory 222 which may be configured as L2 cache or L3 cache. Each cache item in the cache memory 222 is a search result obtained previously, and is registered in the cache memory 222 using a hash value generated from search words and user's access authority as a cache index.

When receiving the combined search expression from the search control unit 212, the cache management unit 218 removes information concerning access authority at a private level included in the inclusion relationship expression, and in order to search documents at a domain level and an open domain level, calculates a hash value for the execution of a cache search based on information concerning search words and operators of the received search expression, and the access authority. The cache management unit 218 uses the generated cache index to search the cache memory 222.

In the present embodiment, the access authority at a private level does not relate to a hierarchical group to which the user belongs, and means access authority or privilege level by which the user only is permitted to access. Such a private level is a security level set for a document which is being created or reviewed and is not ready for public view on the network, or a document that has to be highly limited for view, or set depending on a guest or a subscriber when the search server 110 provides a specific commercial search service.

The domain level means a user group including a plurality of users, which may be a department, section or the like in a specific organization. In another embodiment, the domain level may be a user group having the same access authority. The open domain level corresponds to a domain group including a plurality of domain levels, which may be the entire organization. In the case of a commercial search system, for example, the open domain level may have access authority at a guest level. Note that the domain hierarchy may be set appropriately for a specific embodiment, and is not limited to the three levels of hierarchy including private, domain, and open domain.

When a cache hit occurs, the cache management unit 218 returns cache contents to the search control unit 212 to request creation of a search result. When a cache miss occurs, the cache management unit 218 notifies the search control unit 212 of the cache miss. When being notified of the cache miss, the search control unit 212 instructs the index search execution unit 216 to execute a search using the combined search expression.

In this processing, the above-described combined search expression {(ibm AND Patent) AND (acl:UA IN acl:GX IN acl:GY)} is separated into a search expression A=(ibm AND Patent) AND (acl:UA) at a private level and a search expression B=(ibm AND patent) AND (acl:GX IN acl:GY) at a shared level for independent searches. The search expression A gives a search result concerning the private level of the user, and the search expression B gives a search result concerning search words for a group hierarchy to which the user belongs. The search result given by the search expression B is generated to prevent a search result concerning the private level from being shared by all users in the group when a cache hit occurs.

On the other hand, the search expression A enables the search of documents having access authority at a private level of the user, and therefore when the user demands a search including a private level also, the search result creation unit 214 receives each search result by the search expression A and the search expression B, and generates (the search result by the search expression A) ∪ (the search result by the search expression B) as a search result, thus creating a search result set to be returned to the user. On the other hand, when the user demands a search not including a private level or the user does not have a privilege level, the search for the search result B only is executed, and the search result creation unit 214 receives (the search result by the search expression B) only to create a search result to be returned to the user.

When the document search system 100 is a closed system in a specific group, what level of a search result should be returned to a user can be designated on an on-demand manner by the user by setting of a radio button or a check box when the user sends a search request. When the document search system 100 is an open system for a commercial search, it is judged whether the user is a privilege user or not based on the user authentication at the time of log-on to designate whether or not to generate a search result at a private level, which is then acquired by the search server 110 as user information, so that the search result generation processing can be changed.

When the search control unit 212 judges that a cache miss occurred, the search control unit 212 passes the combined search expression to the index search execution unit 216. In the present embodiment, at this time, after the search expression A and the search expression B are created from the combined search expression, the IN operator included in the search expression is changed into an OR operator that SQL (Structured Query Language) can interpret, thus changing the formant into one enabling execution of the full-text index search by the index search execution unit 216. The conversion processing from the IN operator to the OR operator can be executed by the search control unit 212, or can be executed by the index search execution unit 216, where the index search execution unit 216 receives the combined search expression including the IN operator to execute the conversion processing. In this way, any processing unit can execute the conversion processing.

The index search execution unit 216 uses the converted search expression A and the converted search expression B to execute independent full-text index searches. The full-text search is executed by conducing analysis using a SQL parser to execute the search processing, and scanning the index list storage unit 220b for each search word and access authority combined by an AND operator and an OR operator to extract information of a title of a document corresponding to a document identification value referred to by an inverted index and a storage position thereof. The extracted data is sent to the search control unit 212, and is sent from the search control unit 212 to the cache management unit 218 and the search result creation unit 214 to conduct a registration processing in the cache memory 222 and create a search result.

When a plurality of search results exist, the search result creation unit 214 calculates a union in accordance with a search request based on the cache contents or the result of the index search, so as to create a search result set. Thereafter, the document search unit 206 returns the created search result from the network adaptor 202 to the originator of the search request via the network 108, thus ending a series of transactions of the secure search according to the present embodiment.

In the above processing, the search server 110 can register, via the cache management unit 218, previous search results of the above-described search expression A, the search expression B, or the search expression A and the search expression B, using hash values of the search expression A and the search expression B as the respective cache indexes. Therefore, when the cache management unit 218 receives a search request giving the same search expression in the same group to which users who executed a search in the past belong to, a cache hit occurs for the search request from the same group. In this case, if a user does not require a search at a private level, a secure search is enabled without executing a set operation at all. Even when a secure search including a private level is executed, a set operation can be executed only once at most, and this set operation depends on only a cache hit ratio and the necessity of a search result at a private level, irrespective of an increase in the group hierarchy levels In the present embodiment, the cache hit ratio increases with an increase in the number of users who belong to a specific group, and search results relating to an inclusion relationship only are registered as cache contents irrespective of an increase in the group hierarchy. Thus, in the present embodiment, a search efficiency of the document search system 100 using a full-text search can be remarkably improved, irrespective of an increase in the number of users or an increase in the group hierarchy levels, and scalability thereof can be secured.

Figure 3:
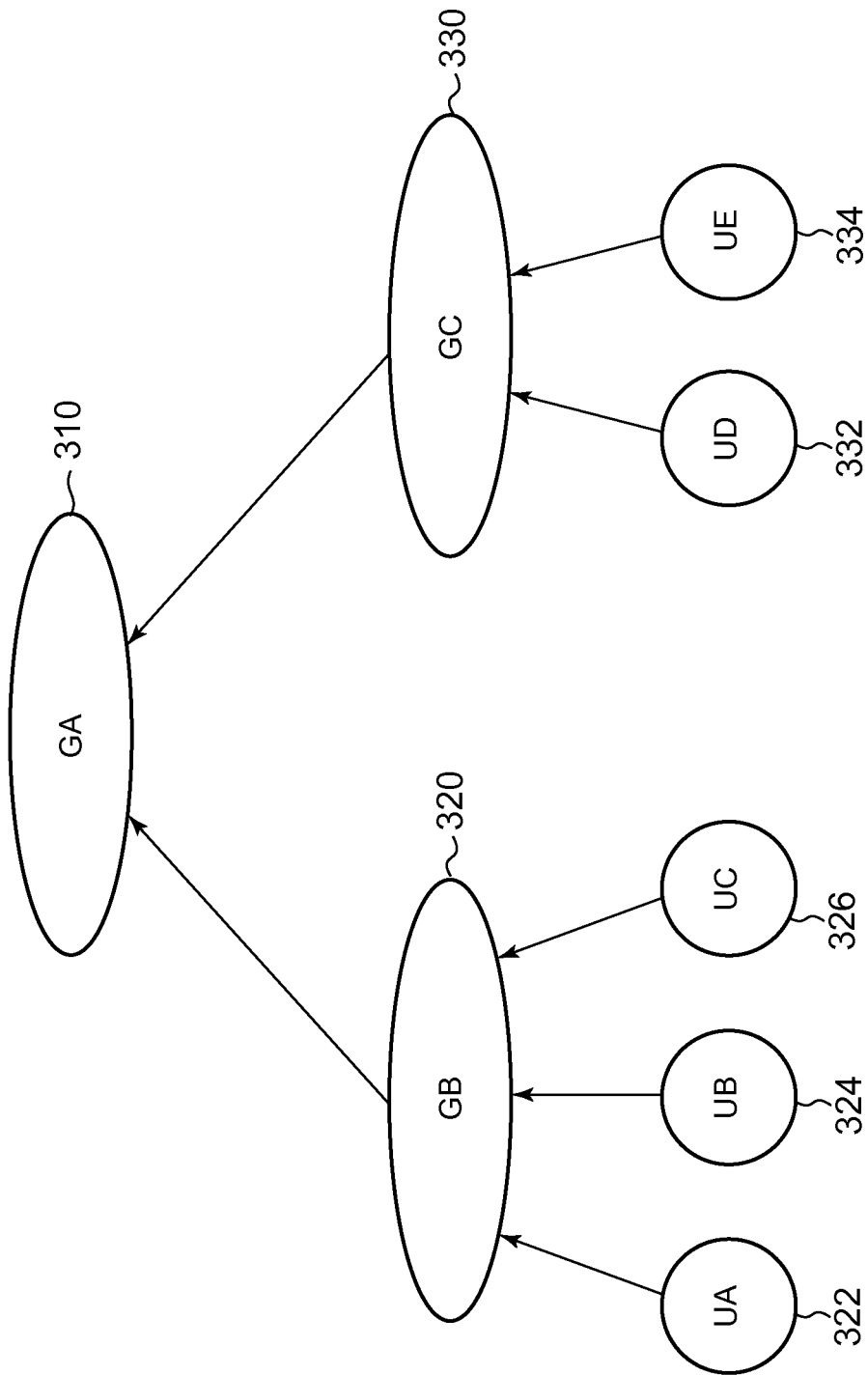
FIG. 3 illustrates an example of a group hierarchical structure 300 of users according to the present embodiment.

FIG. 3 illustrates an example of a group hierarchical structure 300 of users according to the present embodiment. As illustrated in FIG. 3, in the group hierarchical structure 300 of the present embodiment, a specific user, e.g., UA 322 belongs to group B (GB) 320, and GB 320 further belongs to group A (GA) 310. User D (UD) 332 and UE 334 belong to group C (GC) 330, and GC 330 belongs to GA 310.

GB 320 and GC 330 do not have a relationship in the hierarchical structure. However, GB 320 and GC 330 make up the membership of GA 310 that is a group in an upper level. In the group hierarchical structure 300 illustrated in FIG. 3, the hierarchy level of UA 322 to UC 326, UD 332 and UE 334 is at a private level having the narrowest access authority, and GB 320 and GC 330 are at a domain level where access authority is given to a plurality of users belonging to the same group.

GA 310 is at an open domain level where the widest access authority is given. Documents assigned to GA 310, which is at the open domain level, can be accessed from either domain of the GB 320 and GC 330A based on the access authority. On the other hand, documents at the domain level are assigned access authority which allows access by only a user who belongs to the corresponding domain, and documents at the private level can be accessed basically by the corresponding user only, so that a secure search is enabled.

In the context of the present embodiment, the group hierarchical structure 300 illustrated in FIG. 3 is collectively managed by the user management server 120 rather than the search server 110, and the search server 110 receives a search request and receives access authority as user information on-the-fly from the user management server 120. Therefore, the security level setting and the search processing can be completely separated from each other, and a change of user's access authority and a change of the hierarchical structure after setting the document search system 100 can be set completely separated from the search server, and do not affect the indexing processing and the search processing by the search server 110.

FIG. 4 illustrates an example of a full-text index 400 managed by the search server 110 of the present embodiment. The full-text index 400 is configured as a so-called inverted index, including words extracted from a document by the search server 110 and a document identification value of a document including the words, which is configured as a record for each word. In order to process access authority at the same level as words, the illustrated full-text index 400 further includes access authority indexes registered in a field 410 where words are to be registered. For instance, as illustrated in a field 420, a word "ibm" appears in document 1, document 2, document 4, . . . , and a word "patent" appears in document 2, document 3, document 4, . . . .

In the field 410, access authority set for documents is added as an inverted index. For instance, acl:UA indicates that documents to which user UA is allowed to access at a private level are document 1, document 4, . . . . In the field 410, it is further indexed as acl:GX indicating that documents to which users who belong to group X are allowed to access are document 3, document 4, . . . . The words included in the field 410 are used as search words included in a search request, and in the illustrated embodiment, the access authority also is included in the search request at the same level as that of the search words. The inverted index illustrated in FIG. 4 may include occurrence positions of the words in association therewith, as well as the document identification values. Its implementation format is not limited especially as long as at least a word and a document identification value are associated with each other.

A box 430 illustrates examples of a combined search expression used when the index search execution unit 216 of the present embodiment executes a search, a search result, and a cache index generation processing executed when the search result is cached. The search request in the box 430 illustrates one embodiment where user UA belonging to group GX requests a secure search including a document search at his/her own private level. User UA inputs his/her own user ID, password and the like through the terminal device 102 to log on the search server 110, and sends a search request to the search server 110, where search word=ibm is set, for example. Thereafter, the search control unit 212 combines the received search expression with the inclusion relationship expression.

In the illustrated embodiment, it is assumed that the search control unit 212 receives a notification of a cache miss from the cache management unit 218, and the index search execution unit 216 performs index search. When the search server 110 judges that a cache miss occurred, the search server 110 modifies "query=ibm AND (acl:UA IN acl:GX)" generated by the search control unit 212, i.e., changes an IN operator into an OR operator, which is a standard operator of SQL, to generate a search expression "query=ibm AND (acl:UA OR acl:GX)". In the illustrated embodiment of box 430, the index search execution unit 216 further creates queryA=ibm AND (acl:UA) and queryB=ibm AND (acl:GX) to execute independent full-text index searches. These search operations may be executed one by one or may be executed in parallel. The above-stated queryA is a search expression at a private level, and queryB is a search expression at a shared level.

In the illustrated embodiment of FIG. 4, since the documents including the search word=ibm are document 1, document 2, and document 4, and the access authority of user UA permits document 1 and document 4, queryA creates, as search result A, {document 1, document 4}. Since the access authority of group X permits document 3 and document 4, {document 4} is returned as a search result B of queryB. The search control unit 212 stores each of the search results A and B in the cache memory 222 in accordance with a specific purpose. At that time, hash values are calculated using information on the query A and query B, which are set as cache indexes. The search control unit 212 further receives the search results A and B to generate a union and remove any overlap thereof, thus generating a search result={document 1, document 4}.

The hash calculation for generating the cache index may be hash(ibm+AND+acl:UA) targeting the entire search expression, or may be hash(ibm)+hash(AND)+hash(acl:UA). Any hash calculation algorithm may be used as long as a search expression and cache contents can be associated with each other. In the hash calculation, any known hash function may be used, including SHA-1, SHA-2, MD-2, MD-4, MD-5, or the like.

As a result of the above-stated cache index generation processing, when all users who belong to group X issue search requests using the same search words, a cache index of the search result except at a private level will be hash(ibm+AND+acl:GX). Therefore, a user of group X can generate a cache hit to cache contents (search result) associated with the cache index hash(ibm+AND+acl:GX). On the other hand, as for the private level, even when user M of group X issues the same search word, a cache miss occurs because the cache index registered is hash(ibm+AND+acl:UA) while a hash value generated by the cache management unit 218 is hash (ibm+AND+acl:UM). In this way, it is understood that security at a private level can be secured.

Figure 5:
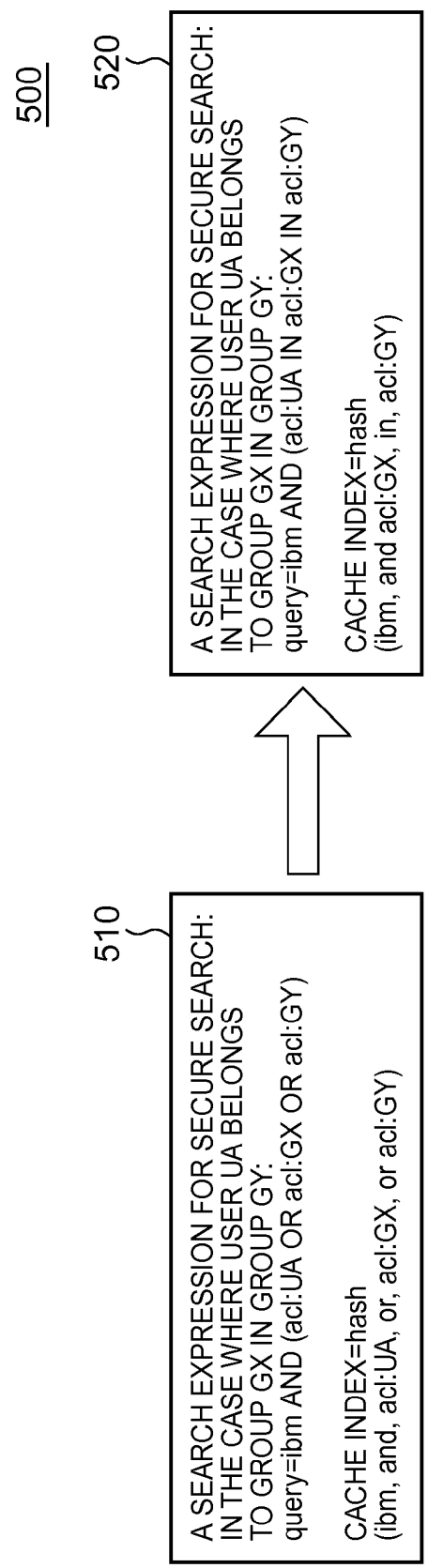
FIG. 5 illustrates a comparison of cache index creation processing 500 for caching a search result.

FIG. 5 illustrates a comparison of cache index generation processing 500 for caching a search result. As illustrated in box 510, in a conventional cache index generation processing, all information included in a search expression is used to hash the all information. Although FIG. 5 illustrates the hash calculation as hash(ibm, acl:GX, in, acl:GY), this is for purpose of exemplifying data used in the hash calculation and a hash value may be calculated in any manner using such data. As illustrated in FIG. 5, unless the same user issues a search request using the same search word and operator, a cache hit does not occur. On the other hand, according to the cache index generation processing of the present embodiment, as illustrated in box 520, in order to share cache items at a domain level, information excluding those concerning the access authority at a private level included in a search expression is used to generate a hash value as a cache index.

When a user requests a search at a private level in the present embodiment, a search expression including only the information concerning a private level is generated, a hash value or cache index is generated, and a search result thereof is cached in the cache memory 222 together with the cache index.

FIG. 6 illustrates an example of a data structure 600 generated in the cache memory 222 of the present embodiment. The data structure 600 generated includes records in which a field 610 for registering cache indexes and cache contents (search result) indexed using the cache indexes are associated with each other. The cache management unit 218 searches the cache indexes, and returns the cache contents of a record with hash values agreeing with each other as a search result to the search control unit 212, thus achieving speed-up of the search processing.

The field 610 for registering cache indexes includes hash values as the cache indexes each of which is generated from a search expression excluding information concerning a private level from search words (including access authority) included in a combined search expression generated by the search control unit 212, thus achieving a cache hit in the units of groups. As the cache contents, search results at a shared level or search results at a private level are registered as in "DOC (ibm) in GX ∪ DOC(ibm) in GY", for example, in the filed 620. The search results at a shared level and the search results at a private level are, as shown in the field 610, identified by the cache indexes. Herein, as the cache contents, real data of a search result may be registered. Alternatively, a real address, a virtual address, an absolute pass name, a URI, a URL or the like for the reference of real data of a search result may be registered so as to use the cache capacity effectively.

Figure 7:
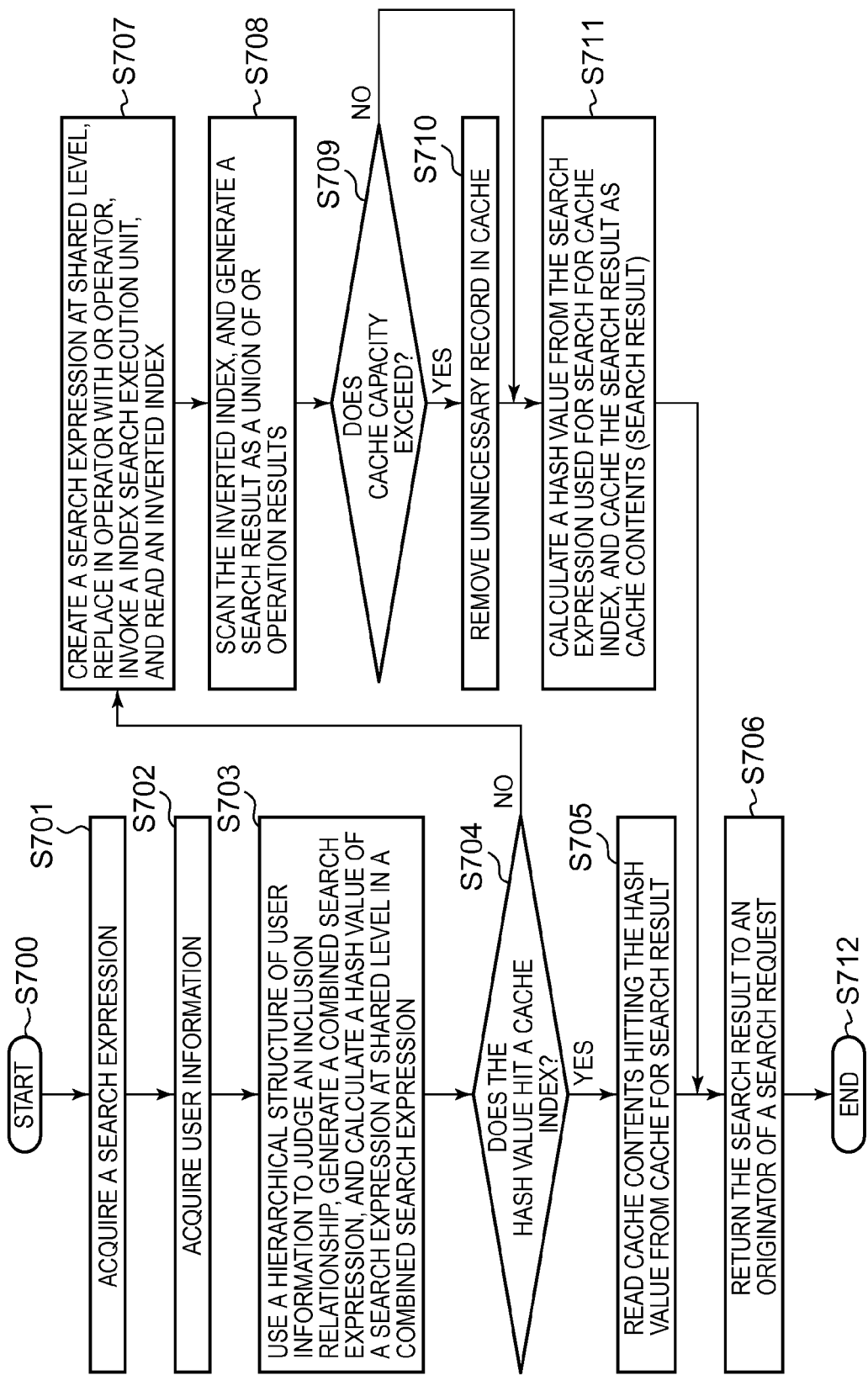
FIG. 7 is a flowchart of a document search processing executed by a search server 110 of the present embodiment.

FIG. 7 is a flowchart of the document search processing when a search is executed at a shared level by the search server 110 of the present embodiment. The processing of FIG. 7 starts at Step S700, and at Step S701 a search expression including one or more search words that a user inputs after log-on is acquired. In the illustrated embodiment, query=ibm is acquired. When the user inputs ibm AND patent as a search expression, query=ibm AND patent is acquired. At Step S702, user's access authority is acquired as user information from the user management server 120. The user information can be acquired from the user management server 120 as information including the access authority at a user's private level, a domain level, and an open domain level, which are refereed to by a user ID of the user after log-on.

At Step S703, the acquired inclusion relationship for each hierarchical level of the user is referred to, and an inclusion relationship expression is set as in "acl:UA IN GX IN GY", for example, and the inclusion relationship expression and the search expression input by the user, e.g., "ibm" and "ibm AND patent" are combined by an AND operator, so that query={ibm AND (acl:UA IN GX IN GY)} or query={(ibm AND patent) AND (acl:UA IN GX IN GY)} is generated as a combined search expression.

Further at Step S703, the above-described combined search expression is sent to the cache management unit 218, and a hash value, hash (ibm, and, in, GX, in GY) is calculated for a search expression at a shared level based on information obtained by removing a search word corresponding to the access authority at a user's private level from the inclusion relationship expression to generate a cache index. At Step S704, the cache management unit 218 searches for the cache index in the cache memory 222 to make a judgment whether a cache hit occurs or not.

At Step S704 if it is judged as a cache hit (yes), the processing proceeds to Step S705, where cache contents corresponding to the hash value is read from the cache memory to acquire a search result, and at Step S706 the acquired contents are sent to the search result creation unit 214 to create a search result, which is sent to the originator of the search request via the network 108, thus ending a series of transactions at Step S712.

On the other hand, at Step S704 if it is judged as a cache miss (no), the processing branches to Step S707, where a search expression at a shared level is created by the index search execution unit 216. This processing can be performed by separating the access authority at a private level and an IN operator immediately after thereof included in the inclusion relationship expression of the combined search expression. Therefore, an IN operator in the combined search expression is converted into an OR operator, so as to modify it into a combined search expression that can be processed by a normal SQL parser. Thereafter, at Step S708, SQL or the like is used to scan the index list storage unit 220b in the document database 220 to execute full-text search of documents in the units of OR operators.

At Step S709, the capacity of the cache memory 222 is examined. If the capacity of the cache memory 222 exceeds (yes), unnecessary records among the cache items are deleted at Step S710. The cache items may be deleted by various methods and references, for example, an access frequency lower than a fixed threshold may be used as a reference, or one with older latest access time may be deleted using a time stamp or the like. In this way, an appropriate method that has been known to update cache items so far may be used for this purpose. At Step S709, if the capacity of the cache memory does not exceed (no), the processing branches to Step S711 immediately.

Figure 8:
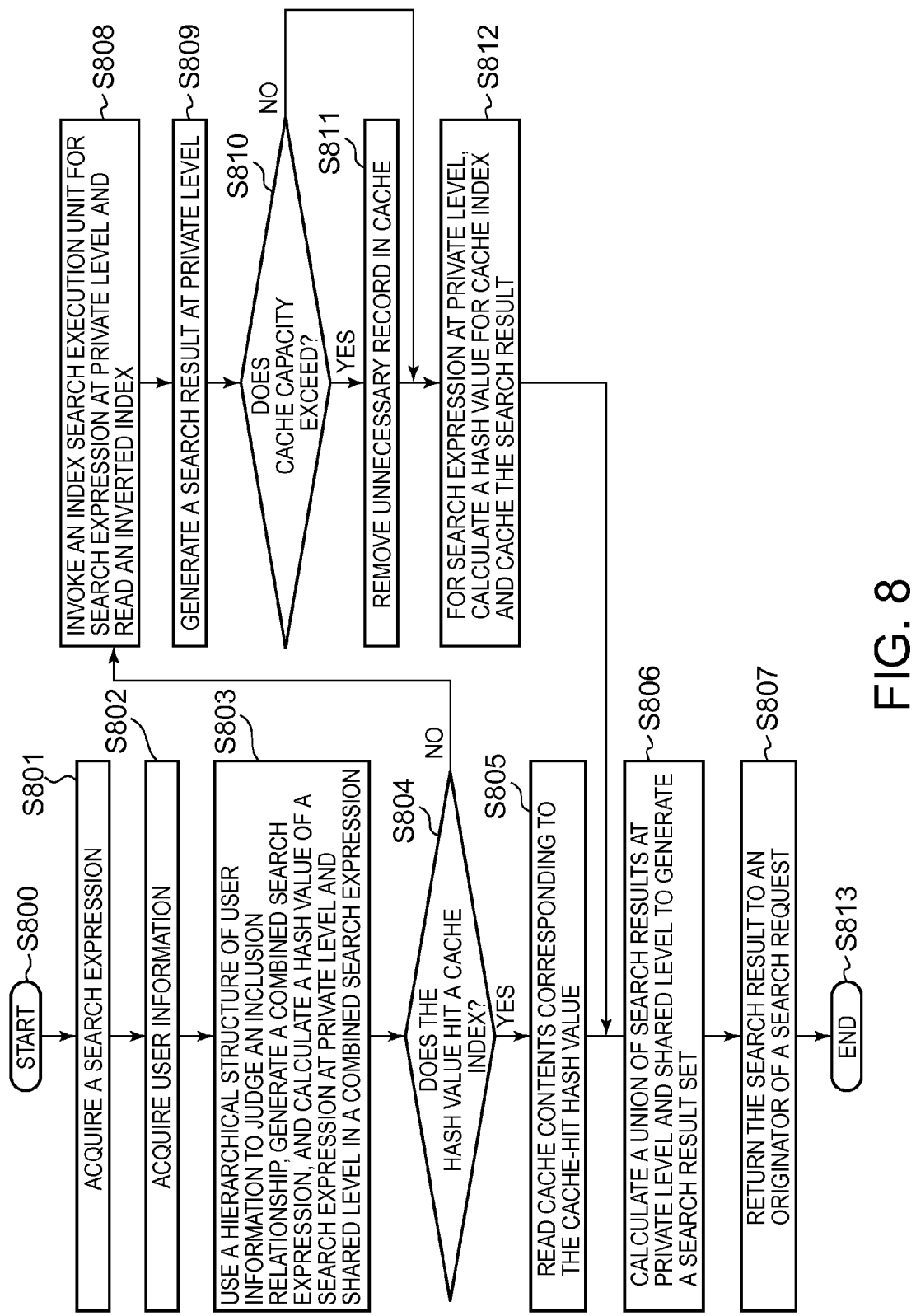
FIG. 8 is a flowchart of a document search processing that generates a search result including a search result concerning a document accessible at a private level only described with reference to FIG. 7.

At Step S711, a cache index is generated from the search expression including an IN operator, and the acquired search result is associated with the cache index, which is then registered as a record of the cache memory 222, thus updating the cache items. Therefore, each search result is sent to the search result creation unit 214 to generate a union, thus generating a search result. Referring now to FIG. 8, the following describes an embodiment of executing a search corresponding to {(ibm AND Patent) AND (acl:UA)}, which is a search at a private level separated from the inclusion relationship expression.

FIG. 8 is a flowchart of a document search processing that generates a search result including a document accessible at a private level, as well as at a shared level. Herein, the embodiment of FIG. 8 assumes that a cache hit does not occur at a private level but occurs at a shared level.

The processing of the embodiment illustrated in FIG. 8 is roughly common to the processing illustrated in FIG. 7. However, in the embodiment of FIG. 8, a cache hit occurs for a search result at a shared level, and at Step S805 cache contents are read, which are then passed to Step S806. Meanwhile, as for a private level, a cache hit does not occur at Step S804 (no), and at Step S808 a search expression {ibm AND (acl:UA)} at a private level is created from (acl:UA IN) separated from the inclusion relationship expression. At Step S809, the search expression {ibm AND (acl:UA)} at a private level is used to execute an independent search.

At Step S810, a judgment is made as to whether the cache capacity exceeds or not, and if the cache capacity does not exceed (no), at Step S812 a search result at a private level is stored in the cache memory 222 as a cache item in association with the hash value used as a cache index. If it is judged at Step S810 that the cache capacity exceeds (yes), at Step S810 unnecessary records of cache are deleted, and caching is performed at Step S812.

Thereafter, in the processing of FIG. 8, the processing branches to Step S806, where the search result at a private level is acquired, and the search result creation unit 214 creates a search result set as a union of the search result at a private level and the search result at a shared level that has been buffered in advance. At Step S807, a processing of returning the final search result to the originator of the search request is executed.

The document search processing illustrated in FIG. 8 enables the security search that uses user's input effectively even when access authority at a private level is included in a combined search expression. Further, a search result with access authority at a private level is distinguished from a search result at a domain level and is set as a cache item, whereby even when a secure search request at a private level is executed, it is possible to generate a union of the cache contents without executing an index search at all in case of occurrence of a cache hit, so that a search result can be generated without imposing a large processing load as compared with a case where all search results including the access authority at a private level are cached.

Moreover, even when a group to which a specific user B belongs is changed, user B is allowed to search for a search result in the cache memory 222 at a domain level after the change that has been cached. Meanwhile, in the case where a search result at a user B's private level has been cached, the change in the group to which the user belongs can be dealt with out executing a full-text index search again.

The cache items in the cache memory 222 are cleared when access authority at a private level, a domain level, or an open domain level is modified, and a secure search is conducted under a new setting of access authority. In order to refresh or synchronize the cache items in the cache memory 222, any known method may be used.

FIG. 9 describes the reduction in an OR processing and the improvement in cache item availability by the secure document search of the present embodiment, using a combined search expression 900 in the processing of FIG. 8 including the search result at a private level. If no cache hit occurs at the time when the search with the combined search expression is executed, OR operations are performed for three hierarchical levels, i.e., a private level, a domain level, and an open domain level as illustrated in a combined search expression 910. These OR operations increase with an increase in the hierarchical levels. As for search efficiency of the secure search, calculation overhead increases in accordance with the number of documents as well as the number of hierarchical levels.

On the other hand, according to the present embodiment, since search results at a hierarchical level which is equal to or higher than the private level are cached, as illustrated in a combined search expression 920, it is possible to generate the same search result as that of the combined search expression 910 by ORing a search result at a private level and a cached search result, thus greatly improving the search efficiency.

In another embodiment where a cache index is separately generated and cached for a search result at a private level also, as illustrated in a combined search expression 930, an OR operation on cache items is executed, whereby the same search result as that of the combined search expression 910 can be created. Therefore, even when a processing of generating a combined search expression including an inclusion relationship is added, an increase in cache items leads to a significant reduction in the search processing using a full-text index, so that the search processing by the search server 110 can be greatly improved.

Figure 10:
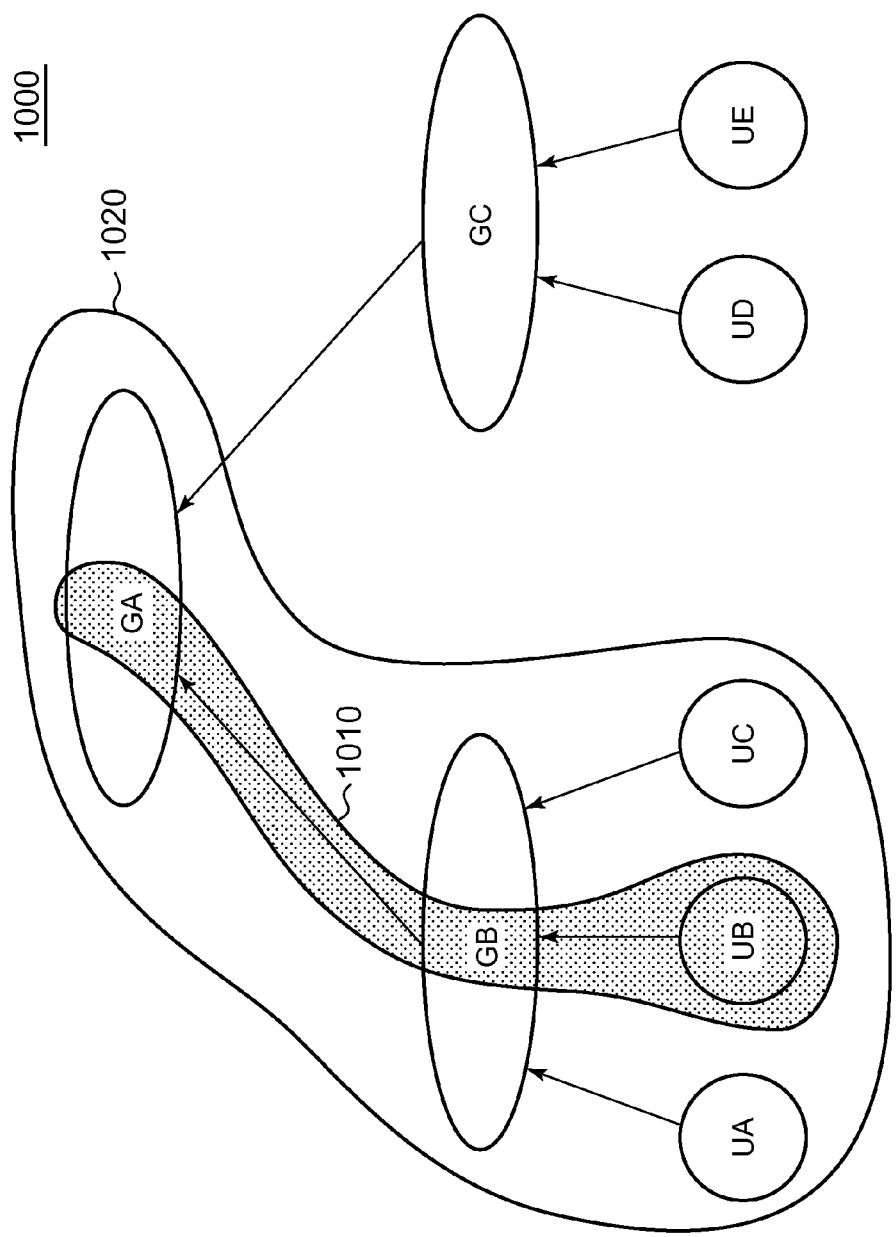
FIG. 10 illustrates a function of improving the search efficiency by a document search system 100 of the present embodiment.

FIG. 10 illustrates a function of improving the search efficiency by the document search system 100 of the present embodiment. As illustrated in FIG. 10, in the conventional method of caching search results, a cache hit does not occur unless the same user inputs the same search expression, and therefore a cache hit ratio will be remarkably low as illustrated in a region 1010. On the other hand, according to the present embodiment as illustrated in FIG. 10, cache hits will increase by at least the number of users as compared with the case of the region 1010, resulting in an increase in the cache hit ratio at least three times as illustrated in a region 1020.

Further, as illustrated in FIG. 10, the cache hit ratio increases nonlinearly with an increase in the number of users who belong to a domain level, so that the increase in the number of users, in turn, leads to improvement of the search efficiency. Additionally, according to the present embodiment, an OR operation for each hierarchical level can be reduced up to 0 or 1, and the cache memory can be used together, and therefore the present embodiment enables significant improvement in the search efficiency of a secure search using a full-text index.

As described above, the present invention can provide a document search system, an information processing apparatus, a document search method and a program capable of significantly improving search efficiency of a secure search using a full-text index.

The above-stated functions of the present embodiment may be implemented by a device executable program described in an object-oriented programming language such as C, C++, Java®, Java® Beans, Java® Applet, Java® Script, Perl, Ruby, or Python, and such a program may be stored in a device readable recording medium such as a hard disk device, a CD-ROM, a MO, a flexible disk, an EEPROM, or an EPROM for distribution, or may be transmitted via network in a form executable by other devices.

While the present invention has been described so far by way of the embodiment, the present invention is not limited to the above-described embodiment, and another embodiment, addition, change and deletion are all possible as long as they are obvious to those skilled in the art. Any embodiment will be within the scope of the present invention as long as the effects of the present invention can be obtained therefrom.

DESCRIPTION OF REFERENCE NUMERALS

100 Document search system
102, 104, 106 Terminal device
108 Network
110 Search server
120 User management server
200 Functional block (search server)
202 Network adaptor
204 Database management unit
206 Document search unit
208 User information acquisition unit
210 Search expression acquisition unit
212 Search control unit
214 Search result creation unit
216 Index search execution unit
218 Cache management unit
220 Document database
222 Cache memory

The invention claimed is:

1. A computer executable document search method for searching for a document, comprising:
generating, based on user information represented as a group hierarchy having a user identifier and one or more groups joined by one or more operators, an inclusion relationship expression including an operator that designates an inclusion relationship for access authority;
combining the inclusion relationship expression with a received search expression to generate a combined search expression;
for searching at a private level, using the combined search expression to generate a first search expression using the received search expression and specifying the user identifier without specifying the one or more groups; and
for searching at a shared level, using the combined search expression to generate a second search expression using the received search expression and specifying the one or more groups without specifying the user identifier.

2. The document search method according to claim 1, further comprising:
in response to a search request at the shared level,
when a cache item is found at the shared level, returning a search result for the cache item; and
when there is no cache item found at the shared level, executing an index search of an index based on the combined search expression to generate a new search result at the shared level.

3. The document search method according to claim 2, further comprising:
generating a hash value from the second search expression generated from the combined search expression, wherein the second search expression generates the search result at the shared level; and
using the hash value to search for the cache item.

4. The document search method according to claim 1, wherein combining further comprises:
  registering the search result generated from executing the first search expression at the private level as a cache item using a hash value generated from the first search expression.

5. The document search method according to claim 4, further comprising:
  generating the search result set at the private level by generating a union based on a search result at the shared level and the search result at the private level.

6. The document search method according to claim 1, wherein the access authority is set for each of a private level to which a user has access, a domain level including a plurality of users, and an open domain level including a plurality of domain levels to enable secure search.

7. The document search method according to claim 1, wherein an index that is searched comprises a full-text index generated as an inverted index, and wherein the full-text index further includes access authority indexes registered in a field where words are to be registered.

8. A non-transitory device readable recording medium storing a device readable program and that, when executed by a computer, makes the computer execute:
  generating, based on user information represented as a group hierarchy having a user identifier and one or more groups joined by one or more operators, an inclusion relationship expression including an operator that designates an inclusion relationship for access authority;
  combining the inclusion relationship expression with a received search expression to generate a combined search expression;
  for searching at a private level, using the combined search expression to generate a first search expression using the received search expression and specifying the user identifier without specifying the one or more groups; and
  for searching at a shared level, using the combined search expression to generate a second search expression using the received search expression and specifying the one or more groups without specifying the user identifier.

9. The non-transitory device readable recording medium storing the device readable program according to claim 8, that, when executed by a computer, makes the computer execute:
  in response to a search request at the shared level, when a cache item is found at the shared level, returning a search result for the cache item; and
  when there is no cache item found at the shared level, executing an index search of an index based on the combined search expression to generate a new search result at the shared level.

10. The non-transitory device readable recording medium storing the device readable program according to claim 9, that, when executed by a computer, makes the computer execute: generating a hash value from the second search expression generated from the combined search expression, wherein the second search expression generates the search result at the shared level; and using the hash value to search for the cache item.

11. The non-transitory device readable recording medium storing the device readable program according to claim 8, that, when executed by a computer, when combining, makes the computer execute:
  registering the search result generated from executing the first search expression at the private level as a cache item using a hash value generated from the first search expression.

12. The non-transitory device readable recording medium storing the device readable program according to claim 11, that, when executed by a computer, when combining, makes the computer execute:
  generating the search result set at the private level by generating a union based on a search result at the shared level and the search result at the private level.

13. The non-transitory device readable recording medium storing the device readable program according to claim 8, wherein the access authority is set for each of a private level to which a user has access a domain level including a plurality of users, and an open domain level including a plurality of domain levels to enable secure search.

14. An information processing apparatus that searches for a document, comprising:
  a hardware processor; and
  a device readable recording medium coupled to the hardware processor, wherein the device readable recording medium stores a program, and wherein the program is executed by the hardware processor to:
  generate, based on user information represented as a group hierarchy having a user identifier and one or more groups joined by one or more operators, an inclusion relationship expression including an operator that designates an inclusion relationship for access authority;
  combine the inclusion relationship expression with a received search expression to generate a combined search expression;
  for searching at a private level, use the combined search expression to generate a first search expression using the received search expression and specifying the user identifier without specifying the one or more groups; and
  for searching at a shared level, use the combined search expression to generate a second search expression using the received search expression and specifying the one or more groups without specifying the user identifier.

15. The information processing apparatus according to claim 14, wherein the program is executed by the processor to:
  in response to a search request at the shared level,
    when the cache item is found at the shared level, return a search result for the cache item; and
    when there is no cache item found at the shared level, execute an index search based on the combined search expression to generate a new search result at the shared level.

16. The information processing apparatus according to claim 15, wherein the program is executed by the processor to:
  generate a hash value from the second search expression generated from the combined search expression, wherein the second search expression generates the search result at the shared level; and
  use the hash value to search for the cache item.

17. The information processing apparatus according to claim 14, wherein the program is executed by the processor to:
  register the search result generated from executing the first search expression at the private level as a cache item using a hash value generated from the first search expression.

18. The information processing apparatus according to claim 17, wherein the program is executed by the processor to:
  generate the search result set at the private level by generating a union based on a search result at the shared level and the search result at the private level.

19. The information processing apparatus according to claim 14, wherein the access authority is set for each of a private level to which a user has access, a domain level including a plurality of users, and an open domain level including a plurality of domain levels to enable secure search.

20. The information processing apparatus according to claim 14, further comprising:
- a terminal device that sends a search request via a network, wherein the search request includes the search expression to enable document search using a user identification value; and
- a search server that receives the search request from the terminal device to execute the document search and returns a search result to the terminal device.

* * * * *